(12) United States Patent
Giacomini

(10) Patent No.: US 7,349,435 B2
(45) Date of Patent: Mar. 25, 2008

(54) MULTIPORT OVERHEAD CELL PROCESSOR FOR TELECOMMUNICATIONS NODES

(75) Inventor: Peter J Giacomini, South Plainfield, NJ (US)

(73) Assignee: Bay Microsystems, Inc., San Jose, CA (US)

( * ) Notice: Subject to any disclaimer, the term of this patent is extended or adjusted under 35 U.S.C. 154(b) by 1036 days.

(21) Appl. No.: 10/193,621

(22) Filed: Jul. 11, 2002

(65) Prior Publication Data

US 2004/0008698 A1 Jan. 15, 2004

(51) Int. Cl.
*H04J 3/16* (2006.01)
*H04L 12/56* (2006.01)

(52) U.S. Cl. ...................... 370/471; 370/413
(58) Field of Classification Search ...... None
See application file for complete search history.

(56) References Cited

U.S. PATENT DOCUMENTS

| | | | |
|---|---|---|---|
| 5,291,482 A * | 3/1994 | McHarg et al. ............. 370/413 |
| 5,394,394 A | 2/1995 | Crowther et al. | |
| 5,864,553 A | 1/1999 | Aramaki | |
| 6,112,299 A | 8/2000 | Ebcioglu et al. | |
| 6,253,112 B1 | 6/2001 | Flora-Holmquist et al. | |
| 6,449,273 B1 | 9/2002 | Jennings, III | |
| 6,728,843 B1 | 4/2004 | Pong et al. | |
| 6,765,928 B1 * | 7/2004 | Sethuram et al. ........... 370/476 |
| 6,778,546 B1 | 8/2004 | Epps et al. | |
| 6,826,713 B1 | 11/2004 | Beesley et al. | |
| 6,888,799 B2 | 5/2005 | Matsumoto | |
| 6,920,135 B1 | 7/2005 | Lea | |
| 7,035,292 B1 * | 4/2006 | Giorgetta et al. ........... 370/509 |
| 7,072,348 B2 | 7/2006 | Frank | |
| 7,085,846 B2 | 8/2006 | Jenne et al. | |
| 7,100,020 B1 | 8/2006 | Brightman et al. | |
| 2001/0030961 A1 | 10/2001 | Gazsi et al. | |
| 2001/0048684 A1 | 12/2001 | Ueda | |
| 2002/0107975 A1 | 8/2002 | Patel et al. | |
| 2002/0141455 A1 | 10/2002 | Akaike et al. | |
| 2002/0172227 A1 * | 11/2002 | Varelas et al. ............. 370/514 |
| 2003/0014264 A1 | 1/2003 | Fujii et al. | |
| 2003/0031204 A1 * | 2/2003 | Ho et al. .................... 370/471 |
| 2003/0053481 A1 | 3/2003 | Abiru et al. | |
| 2003/0072304 A1 | 4/2003 | Gummatta et al. | |
| 2003/0112819 A1 | 6/2003 | Kofoed et al. | |

* cited by examiner

*Primary Examiner*—Huy D. Vu
*Assistant Examiner*—Clemence Han

(57) ABSTRACT

A novel multiport overhead cell processor for processing overhead cells (e.g., SONET/SDH overhead bytes, etc.) in a telecommunications node is disclosed. Some embodiments of the present invention advantageously employ a single instance of logic to process overhead cells for all of a node's input ports. The illustrative embodiment comprises a single overhead cell processor and a memory for storing instances of state variables associated with each input port.

21 Claims, 15 Drawing Sheets

US 7,349,435 B2

MULTIPORT OVERHEAD CELL PROCESSOR FOR TELECOMMUNICATIONS NODES

FIELD OF INVENTION

The present invention relates to telecommunications in general, and, more particularly, to a novel multiport overhead cell processor for nodes in a network (e.g., SONET/SDH networks, etc.).

BACKGROUND OF THE INVENTION

The first generation of optical fiber systems in the public telephone network used proprietary architectures, equipment line codes, multiplexing formats, and maintenance procedures. This diversity complicated the task of the regional Bell operating companies ("RBOCs") and the interexchange carriers (e.g., AT&T, Sprint, MCI, etc.) who needed to interface their equipment with these diverse systems.

To ease this task, Bellcore initiated an effort to establish a standard for connecting one optical fiber system to another. That standard is officially named the Synchronous Optical Network, but it is more commonly called "SONET." The international version of the domestic SONET/SDH standard is officially named the Synchronous Digital Hierarchy, but it is more commonly called "SDH."

Although differences exist between SONET/SDH and SDH, those differences are mostly in terminology. In most respects, the two standards are the same and, therefore, virtually all equipment that complies with either the SONET/SDH standard or the SDH standard also complies with the other. Therefore, for the purposes of this specification, the SONET/SDH standard and the SDH standard shall be considered interchangeable and the acronym/initialism "SONET/SDH" shall be defined as either the Synchronous Optical Network standard or the Synchronous Digital Hierarchy standard, or both.

SONET/SDH traffic comprises fixed-length packets called "frames" that have a data portion and an overhead portion. The data portion contains the end-user's payload data and is the reason that the traffic exists. In contrast, the overhead portion contains information that describes how the frame should be handled by the network, provides status on the physical connection, and/or enables enhanced out-of-band features.

A node receives traffic at an input port and transmits traffic via an output port. To switch traffic between one or more input ports and one or more output ports, the node must perform the following tasks:

1. each input port must segregate the incoming traffic it receives into individual frames (this is called "deframing"),
2. each input port must extract the data portion and the overhead portion from each frame,
3. each output port must generate new output overhead portions for each frame,
4. a switch in the node must route each data portion to the appropriate output port, and
5. each output port must generate output frames from the switched data portions and the output overhead portions (this is called "framing").

In the prior art, these tasks are performed concurrently by one or more input ports and one or more output ports.

FIG. 1 depicts a block diagram of the salient components of telecommunication network 100, which is a SONET/SDH mesh network comprising eight nodes, nodes 110-1 through 110-8, which are interconnected by twenty-two unidirectional links 120 wherein the link denoted 120-*a*-*b* transports traffic from node 110-*a* to node 110-*b*. Each link arriving at a node comprises one or more input ports, and each outgoing link comprises one or more output ports.

FIG. 2 depicts an exemplary signal 200 transmitted in the network. Signal 200 is composed of fixed-size frames 210-*w*, where w is a positive integer; furthermore, as shown in FIG. 3, each individual frame 210-*w* is made up of an overhead portion 310-*w* and a data portion 320-*w*. As is well-understood in the art, the overhead portion contains information describing how the frame should be handled by nodes receiving the frame. Also, as is well understood in the art, the overhead and data portions of the frame are not necessarily spatially or temporally contiguous; for example, overhead portions in SONET/SDH frames are interleaved.

As is shown in FIG. 4, overhead portion 310-*w* comprises one or more overhead blocks 410-*w*-*h*, where h is a positive integer, and each of these overhead blocks further comprises one or more overhead cells 420-*w*-*h*-*m*, where m is a positive integer. In SONET/SDH-based networks, overhead blocks correspond to the rows of the overhead portion, and overhead cells correspond to individual bytes (e.g., S1, J0, etc.). As is well understood in the art, the structure of overhead portion 310-w depicted in FIG. 4 can also apply for network protocols other than SONET/SDH.

FIG. 5 depicts a block diagram of the salient components of the architecture of an exemplary node 110-*i* in network 100 according to the prior art. Node 110-*i* comprises M input processors 510-1 through 510-M (one for each input port), switch 530, and N output processors 550-1 through 550-N (one for each output port), interconnected as shown.

Node 110-*i* has M input ports, corresponding to incoming links $\{120\text{-}j_1\text{-}i, 120\text{-}j_2\text{-}i, \ldots, 120\text{-}j_M\text{-}i\}$, for receiving input signals, where each link $120\text{-}j_\alpha\text{-}i$ originates from node $110\text{-}j_\alpha$. Node 110-*i* has N output ports, corresponding to outgoing links $\{120\text{-}i\text{-}k_1, 120\text{-}i\text{-}k_2, \ldots, 120\text{-}i\text{-}k_N\}$, for transmitting output signals, where each link $120\text{-}i\text{-}k_\alpha$ terminates at node $110\text{-}k_\alpha$.

Each input processor 510-*m* segregates its respective incoming data stream into frames and segregates the data and overhead portions of each frame.

Switch 530 switches the data portions, as is well understood in the art.

Each output processor 550-*n*:

(1) receives the switched data portions from switch 530,
(2) generates a new output overhead portion for each data portion,
(3) assembles the data and output overhead portions into output frames, and
(4) transmits the output frame on output port 120-*i*-*n*, as is well-understood in the art.

Note that in SONET/SDH-based networks M typically equals N at every node; however, in other types of networks it may be possible to have nodes with M≠N. Additionally, each node has a plurality of input ports and/or a plurality of output ports; thus N+M>2.

SUMMARY OF THE INVENTION

The present invention is a multiport overhead cell processor for processing overhead cells (e.g., SONET/SDH overhead bytes, etc.) in a telecommunications node. The multiport overhead cell processor employs a single instance of logic to process the overhead cells from some, and possibly all, of a node's input ports. In contrast, in the prior art redundant processing logic is employed for each input port, so that each copy of logic processes overhead cells from a single input port. Consequently, embodiments of the present invention eliminate some of the redundant processing logic of the prior art, thereby reducing the cost, footprint, and power consumption of every node in a network.

The illustrative embodiment according to the present invention, for a telecommunication node having M input ports and N output ports, comprises:

(1) a memory for storing M instances of a non-empty set of variables, wherein each of the instances is associated with a respective one of the M input ports; and (2) a cell processor for
receiving input overhead cells, wherein each of the input overhead cells is associated with a respective one of the input ports, and
generating an output overhead cell based on at least one of:
(a) the input overhead cell, and
(b) the instance of the set of variables associated with the same input port as the input overhead cell,
wherein the output overhead cell is associated with one of the output ports;
wherein M and N are positive integers, $M \geq 2$, and $N \geq 2$.

DETAILED DESCRIPTION

Figure 1:
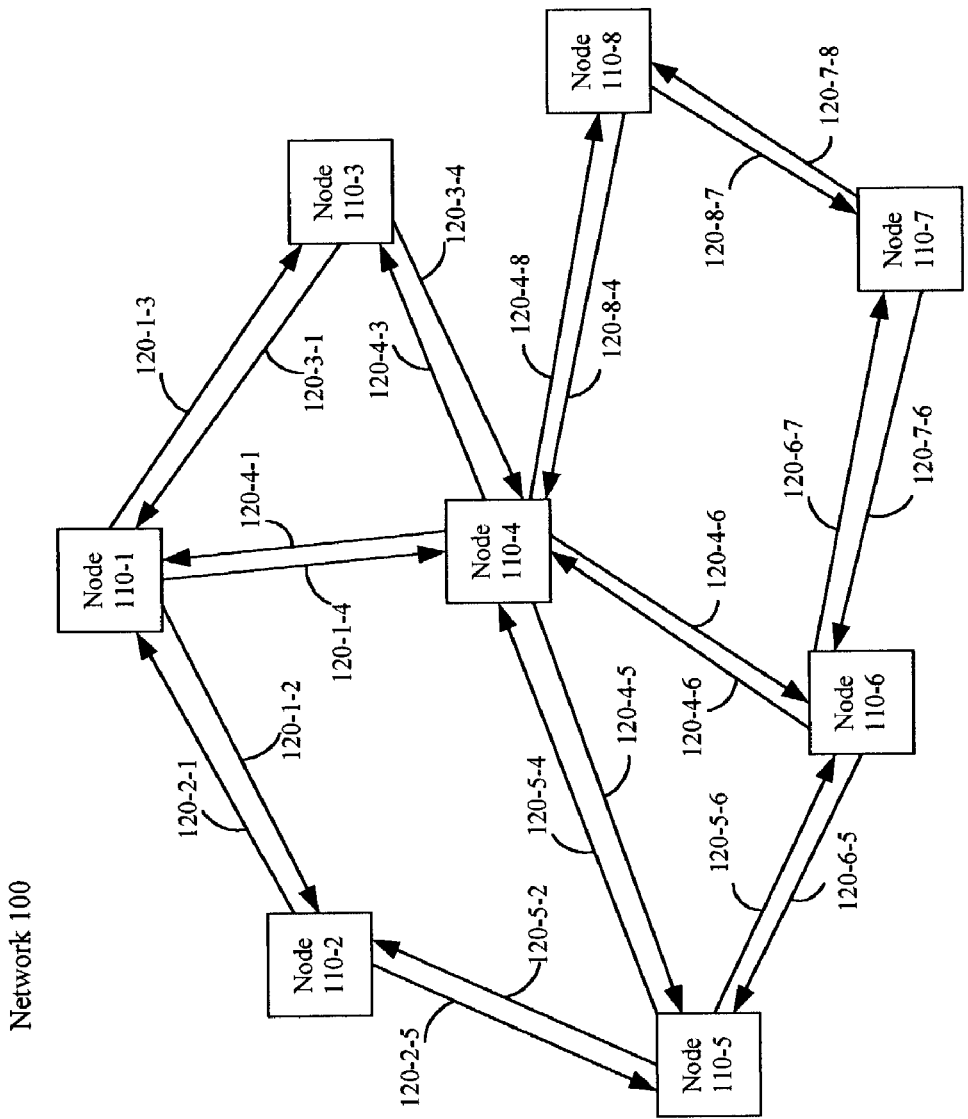
FIG. 1 depicts a block diagram of a representative telecommunication network.
Figure 2:
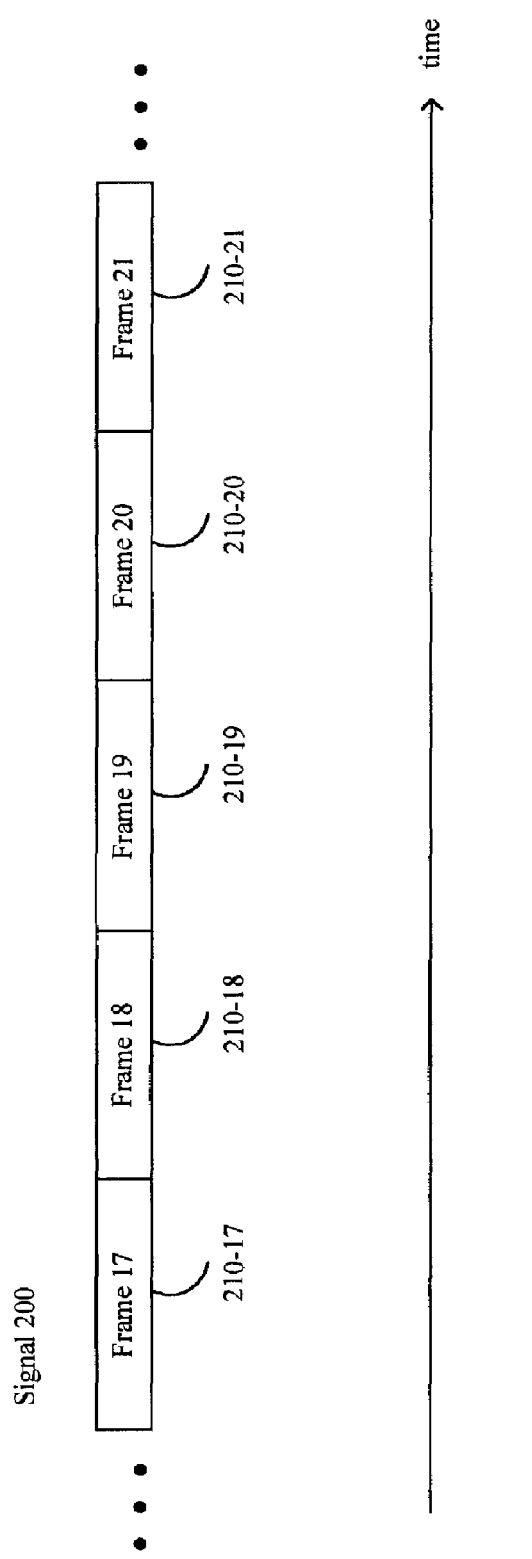
FIG. 2 depicts the structure of a representative signal comprised of fixed-size frames.
Figure 3:
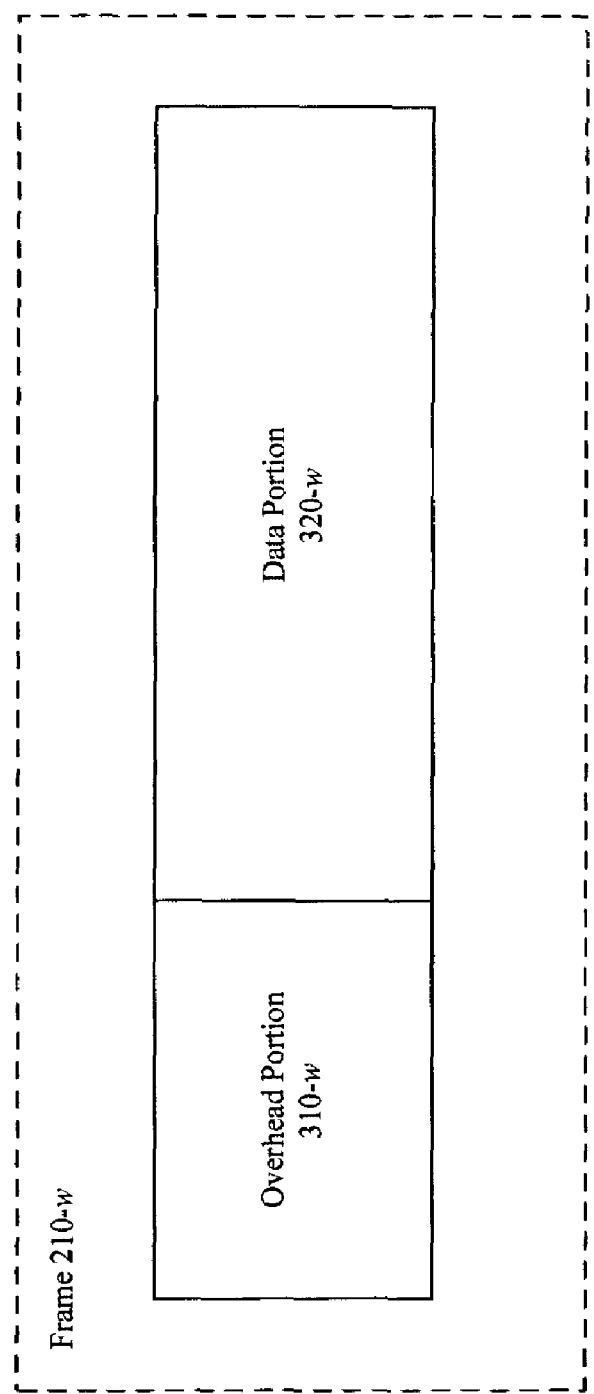
FIG. 3 depicts the structure of frame 210-$i$, as shown in FIG. 2, in the prior art.
Figure 4:
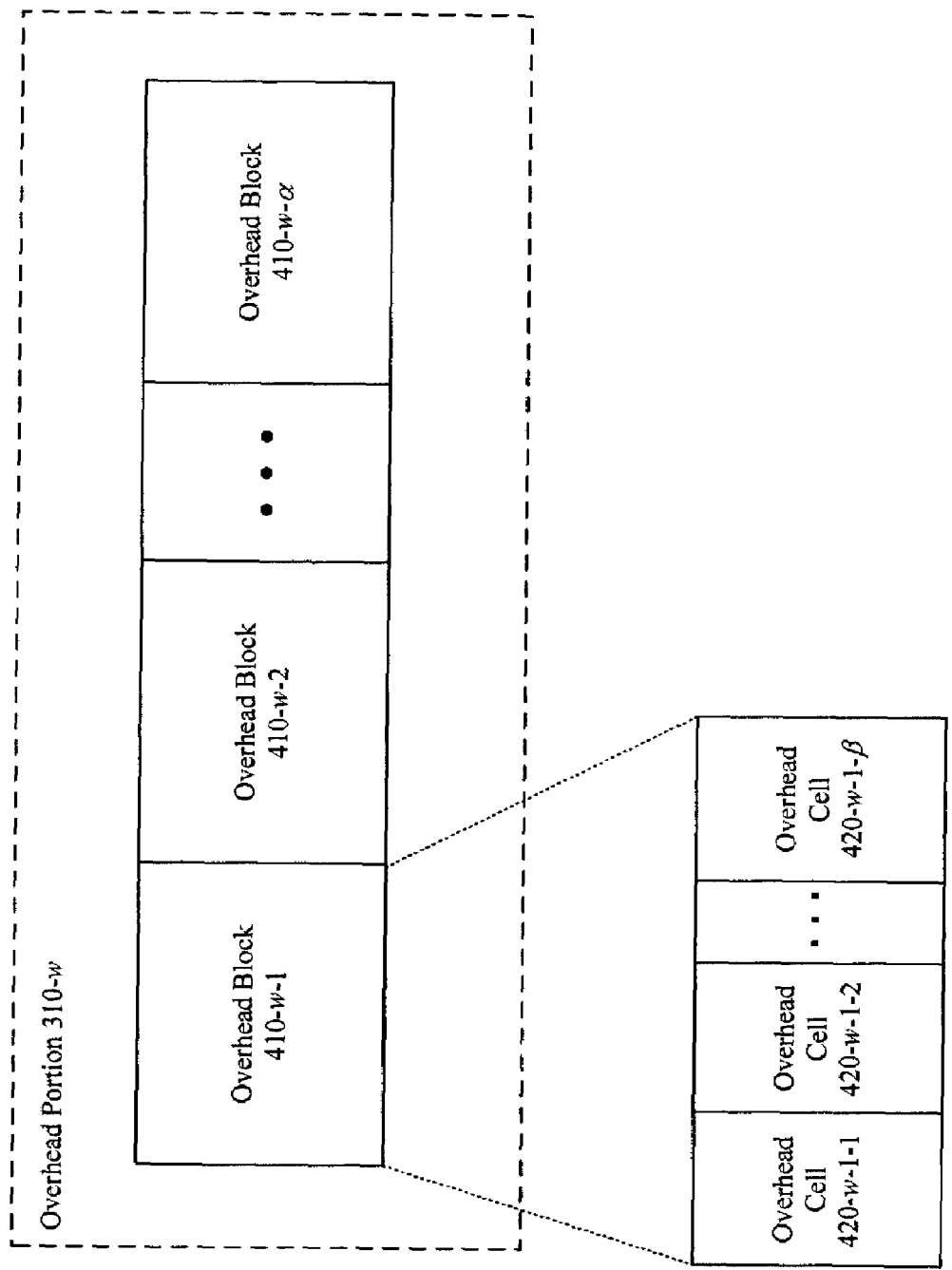
FIG. 4 depicts the structure of overhead portion 310-$w$, as shown in FIG. 3, in the prior art.
Figure 5:
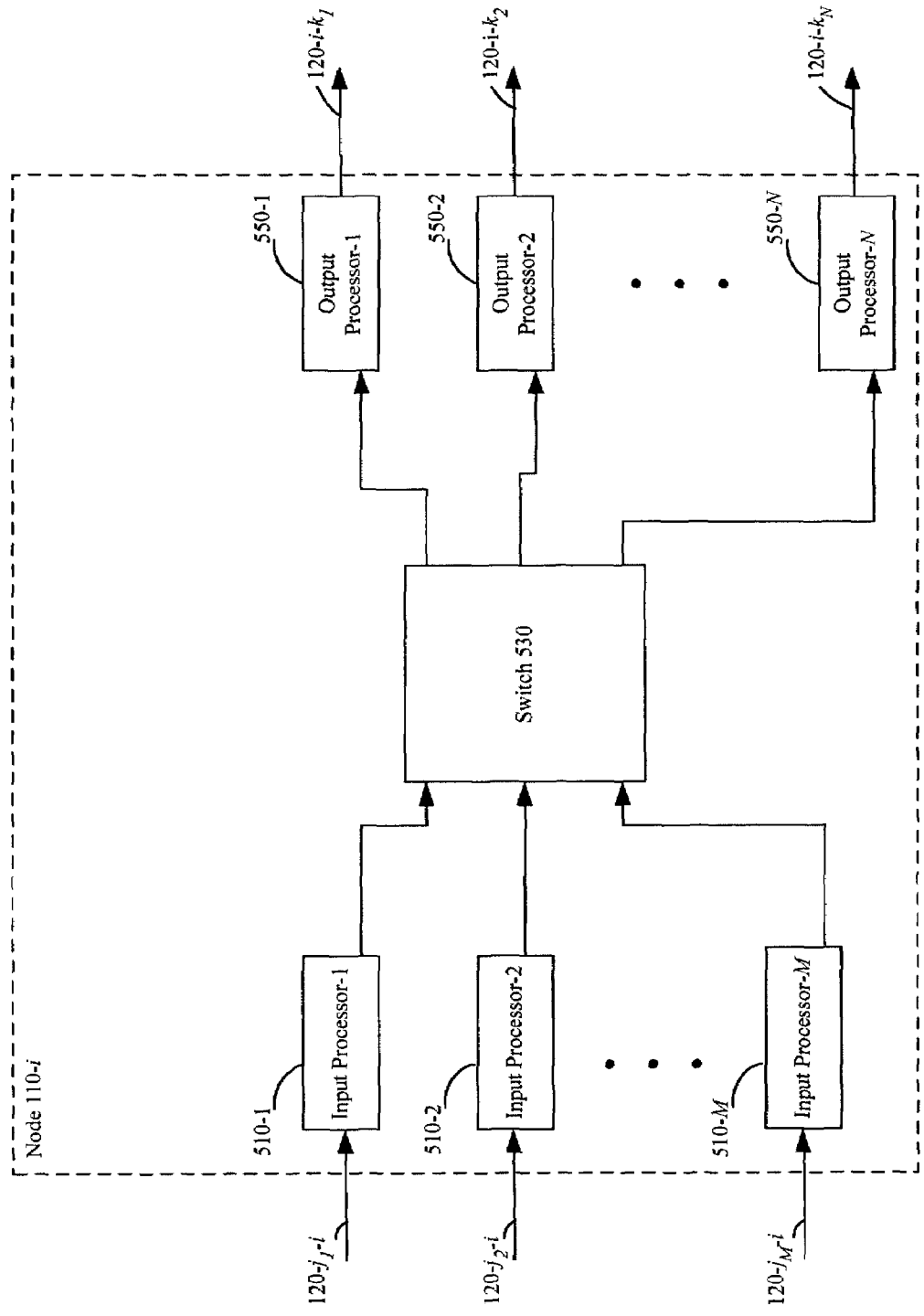
FIG. 5 depicts a block diagram of the architecture of node 110-$i$, as shown in FIG. 1, in the prior art.
Figure 6:
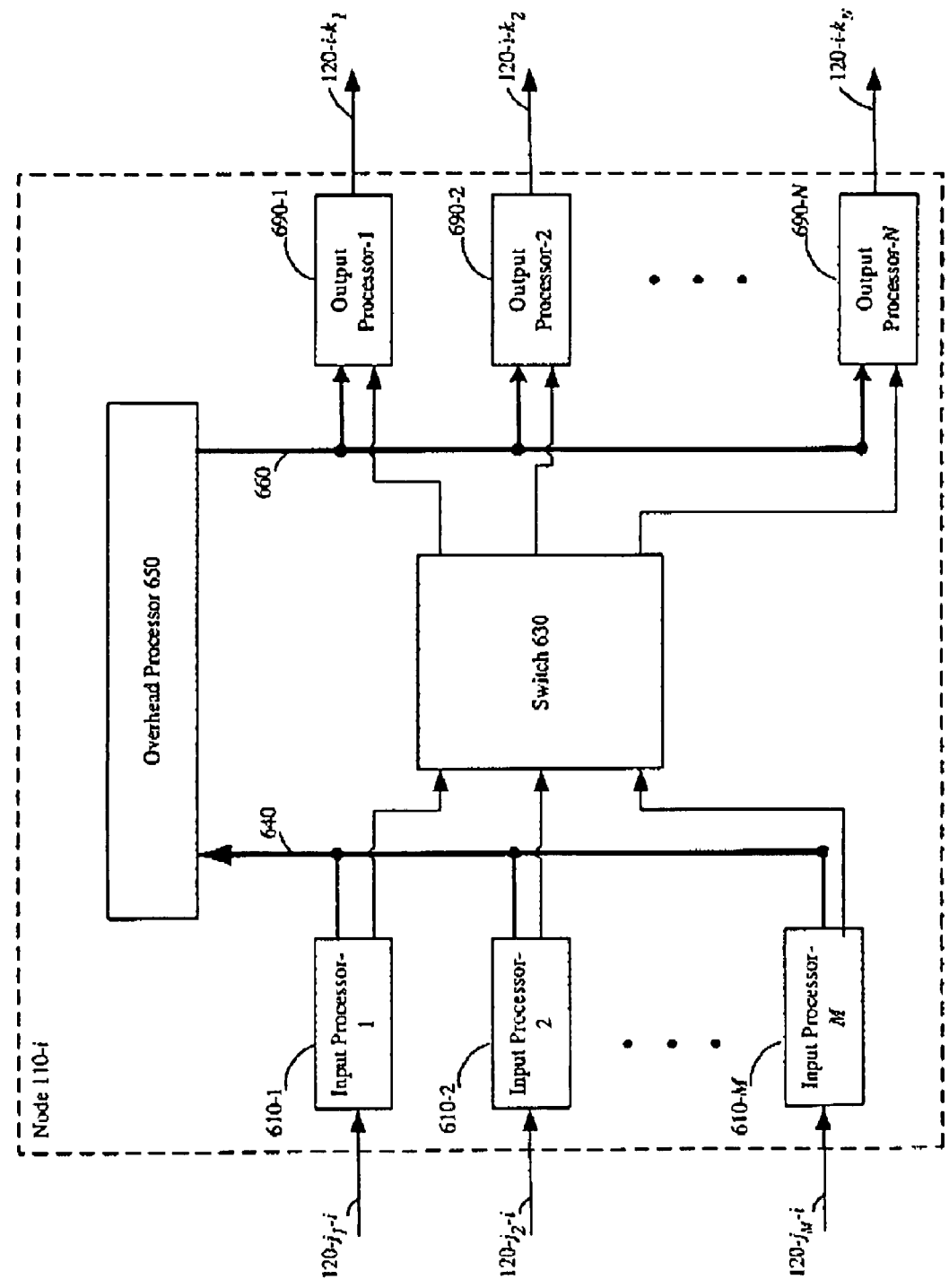
FIG. 6 depicts a block diagram of the architecture of node 110-$i$, as shown in FIG. 1, in accordance with the illustrative embodiment of the present invention.

FIG. 6 depicts a block diagram of the salient components of node 110-$i$ in accordance with the illustrative embodiment of the present invention. Node 110-i comprises: M input processors 610-1 through 610-M, overhead processor 650, switch 630, and N output processors 690-1 through 690-N, interconnected as shown. M is a positive integer that is equal to the number of input ports that node 110-$i$ has and N is a positive integer that is equal to the number of output ports that node 110-$i$ has.

Although in the illustrative embodiment network 100 employs the SONET/SDH protocol, it will be clear to those skilled in the art, after reading this disclosure, how to make and use embodiments of the present invention for other protocols, such as dense wavelength division multiplexing ("DWDM"). Similarly, although the illustrative embodiments of the present invention are disclosed with respect to fixed-length frames, as is the case for the SONET/SDH protocol, it will be clear to those skilled in the art, after reading this disclosure, how to make and use embodiments of the present invention for protocols that employ variable-length frames. Although the illustrative embodiment is a node in a mesh network, it will be clear to those skilled in the art, after reading this disclosure, how to make and use embodiments of the present invention in which some or all of the nodes are interconnected in a ring or non-mesh topology. Although the illustrative embodiment is used with nodes that are connected via uni-directional links, it will be clear to those skilled in the art, after reading this disclosure, how to make and use embodiments of the present invention for nodes connected to other nodes via bi-directional links.

Like input processor 510-$m$ in the prior art, input processor 610-$m$ segregates an incoming data stream into a series of frames and further segregates the data portion of each frame from the input overhead portion of each frame. Also like input processor 510-$m$ in the prior art, cells of the input overhead portion of a frame can be terminated at input processor 610-$m$. In such cases, a corresponding cell is generated at appropriate output processor 690-$n$, just as appropriate output processor 550-n does in the prior art.

However, in other cases, where input processors 510-1 through 510-M and output processors 550-1 through 550-N generate the output overhead portion for transmission by node 110-$i$, input processor 610-$m$, in contrast, sends at least a part of the input overhead portion to overhead processor 650. As is described in detail below, overhead processor 650 generates at least a part of the output overhead portion that is transmitted by node 110-$i$ from output processor 690-$n$.

In the illustrative embodiment of the present invention, input processor 610-$m$ segregates each input overhead portion into a plurality of input overhead blocks for transmission to overhead processor 650 via time-division multiplexed bus 640. This enables a narrower bus between input processor 610-$m$ and overhead processor 650. Furthermore, overhead processor 650 transmits the output overhead blocks to the respective output processors via time-division multiplexed bus 660. This enables a narrower bus between overhead processor 650 and output processor 690-$n$.

Output processor 690-$n$ receives a data portion from switch 630 and at least one output overhead block from overhead processor 650 and assembles an output frame, in well-known fashion, and transmits the frame on output port 120-$i$-$k_\alpha$.

Figure 7:
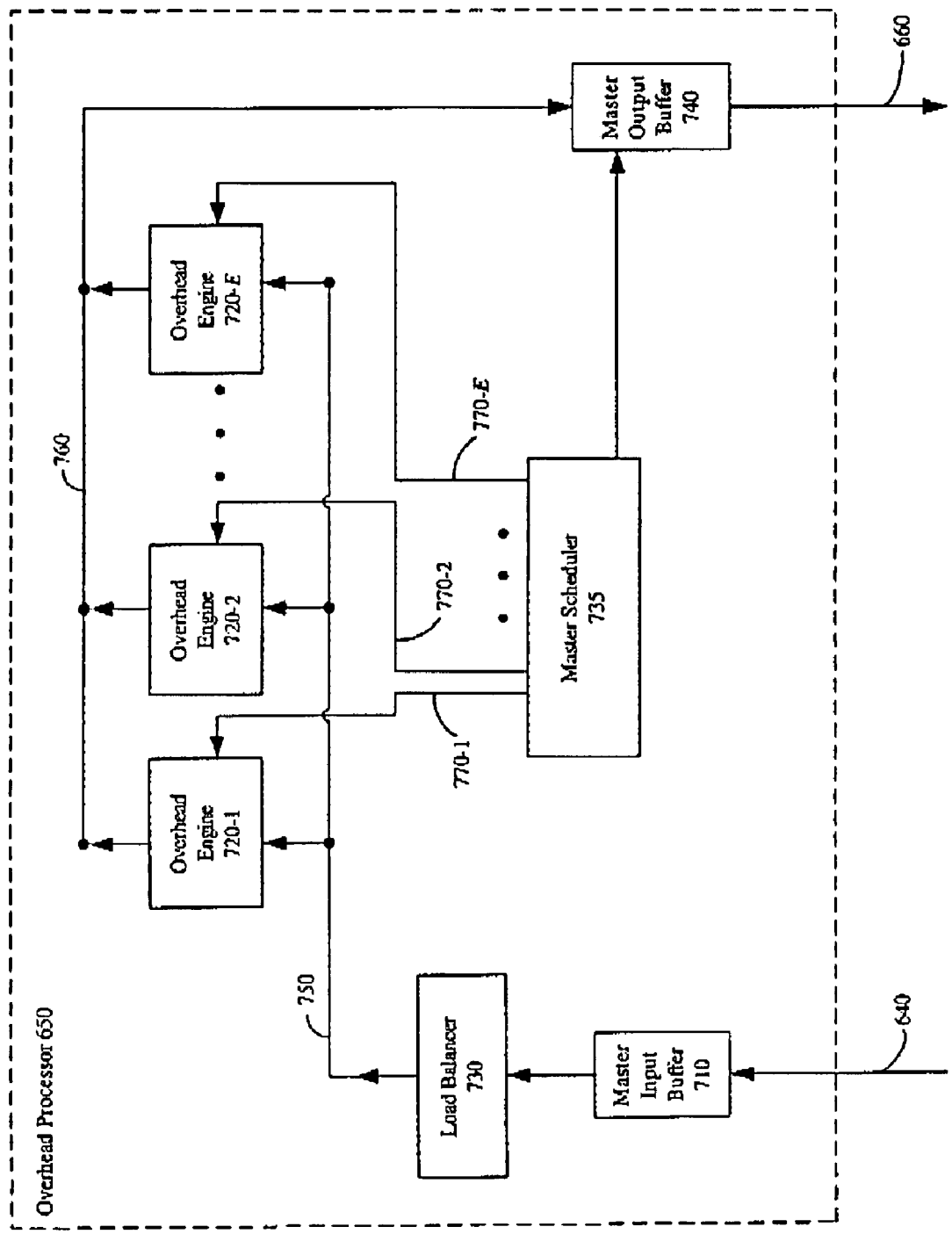
FIG. 7 depicts a block diagram of the first illustrative embodiment of overhead processor 650, as shown in FIG. 6.

FIG. 7 depicts a block diagram of the salient components of overhead processor 650, which comprises: master input buffer 710, load balancer 730, overhead engines 720-1 through 720-E, where E is a positive integer, master scheduler 735, and master output buffer 740.

Master input buffer 710 is a first-in first-out memory (i.e., a "FIFO") for receiving input overhead blocks from input processors 610-1 through 610-M via bus 640. It will be clear to those skilled in the art how to determine the width and depth of master input buffer 710 for any embodiment of the present invention.

Load balancer 730 removes the input overhead blocks from master input buffer 710 and routes each of them to a respective one of overhead engines 720-1 through 720-E. Load balancer 730 employs a load-balancing algorithm to determine which overhead engine should receive each overhead block, such that the objective of the algorithm is to evenly distribute the work of processing the input overhead blocks among the overhead engines; such load balancing algorithms are well-known in the art.

As is discussed in detail below, overhead engine 720 accepts an input overhead block and generates an output overhead block based on the input overhead block, wherein each output overhead block is generated for a respective output port. Note that overhead engine 720 may effectively serve as the "identity function" for some input overhead blocks (i.e., an output overhead block is identical to its corresponding input overhead block).

In order to minimize logic, and thereby minimize cost, space, and power consumption, the overhead engine processes one input overhead block at a time. When the number of such processors E equals M, then an embodiment of the present invention might not provide a reduction in logic in comparison to a node architecture in the prior art, as it merely moves the M copies of such logic found in the input processor 510-$n$ into overhead processor 650. In contrast, when E<M, less logic might be used in an embodiment of the present invention than in a node architecture in the prior art.

When overhead processor 650 comprises fewer than M overhead engines (i.e., E<M), at least one of the E overhead engines must process two or more input overhead portions from a set of M incoming frames. This is an instance of the "pigeon-hole principle," a result from set theory that is well known in the art. Since each overhead engine can process only one input overhead portion at a time, the logic within the overhead engine must be applied in a sequential fashion. This enables the quantity of logic to be reduced in some embodiments of the present invention, thereby reducing cost, space, and power consumption. In other words, the cost, space, and power consumption of overhead processor 650 varies with the number of overhead engines. On the other hand, when overhead processor 650 comprises fewer overhead engines, each overhead engine must process an input overhead block more quickly. The illustrative embodiment of the present invention comprises one overhead engine.

Each overhead engine outputs one or more output overhead blocks and master scheduler 735 coordinates when the overhead engines 720 transmit the output overhead blocks to master output buffer 740. In the illustrative embodiment, master scheduler 735 sends signals via 770-1, 770-2, and 770-E so that the output overhead blocks arrive at master output buffer 740 ordered by output port number (i.e., all the output overhead blocks for output port 1 are transmitted to master output buffer 740, followed by all the output overhead blocks for output port 2, etc.). Such ordering can be accomplished, for example, by time-division multiplexing the output overhead blocks on bus 760.

Master output buffer 740 receives output overhead blocks from overhead engines 720 via 760, and transmits the output overhead blocks out of overhead processor 650 via 660. Master output buffer 740 is a FIFO. It will be clear to those skilled in the art how to make and use master output buffer 740.

Figure 8:
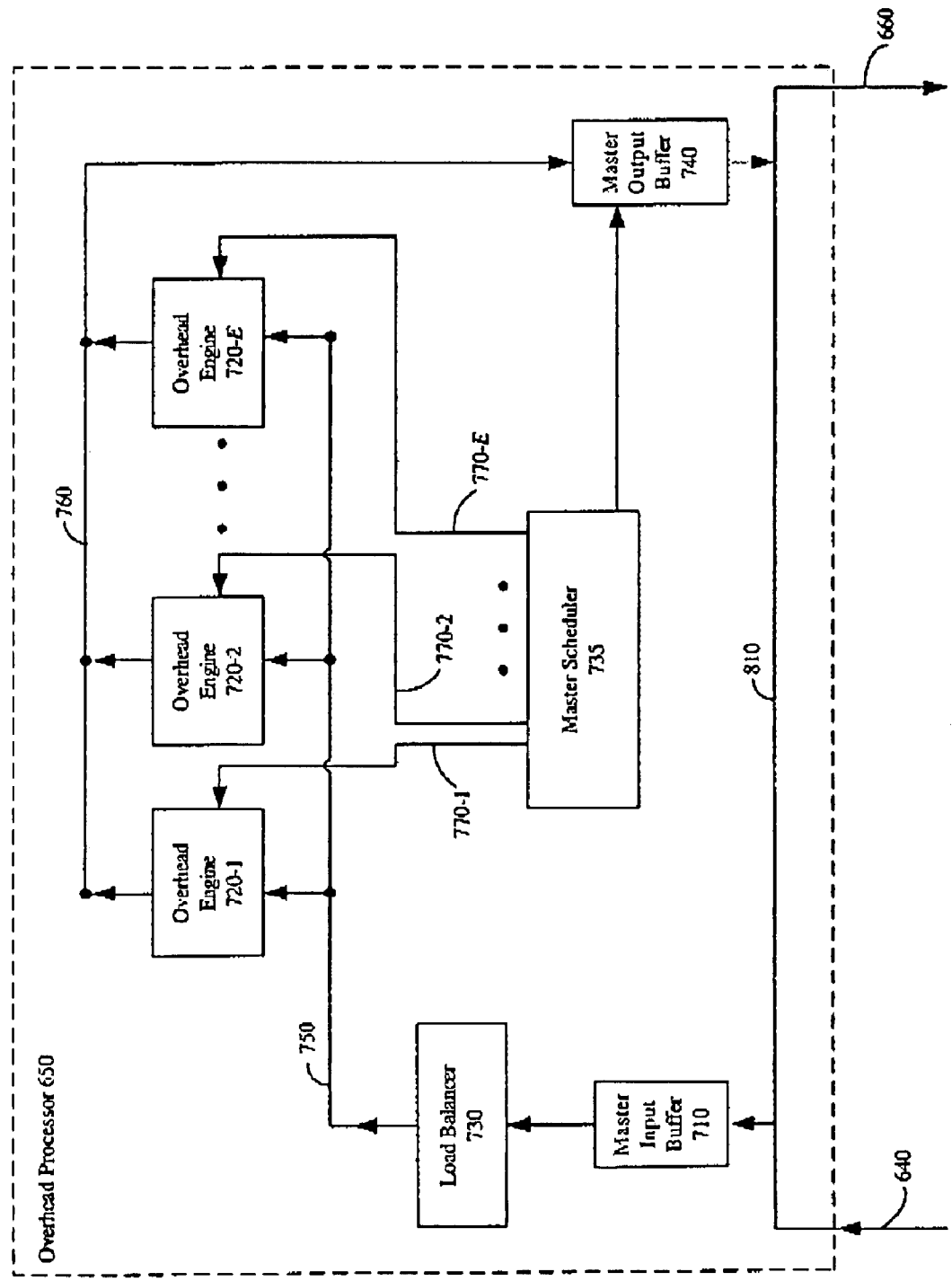
FIG. 8 depicts a block diagram of the second illustrative embodiment of overhead processor 650, as shown in FIG. 6.

FIG. 8 depicts a block diagram of a second illustrative embodiment of overhead processor 650. This embodiment is the same as the first illustrative embodiment shown in FIG. 7, with the exception that input 640 and output 660 are tied to a common bus 810. This second embodiment has the advantage of allowing individual overhead portions to easily bypass the overhead engines when such individual overhead portions remain unchanged between the input ports and the output ports.

Figure 9:
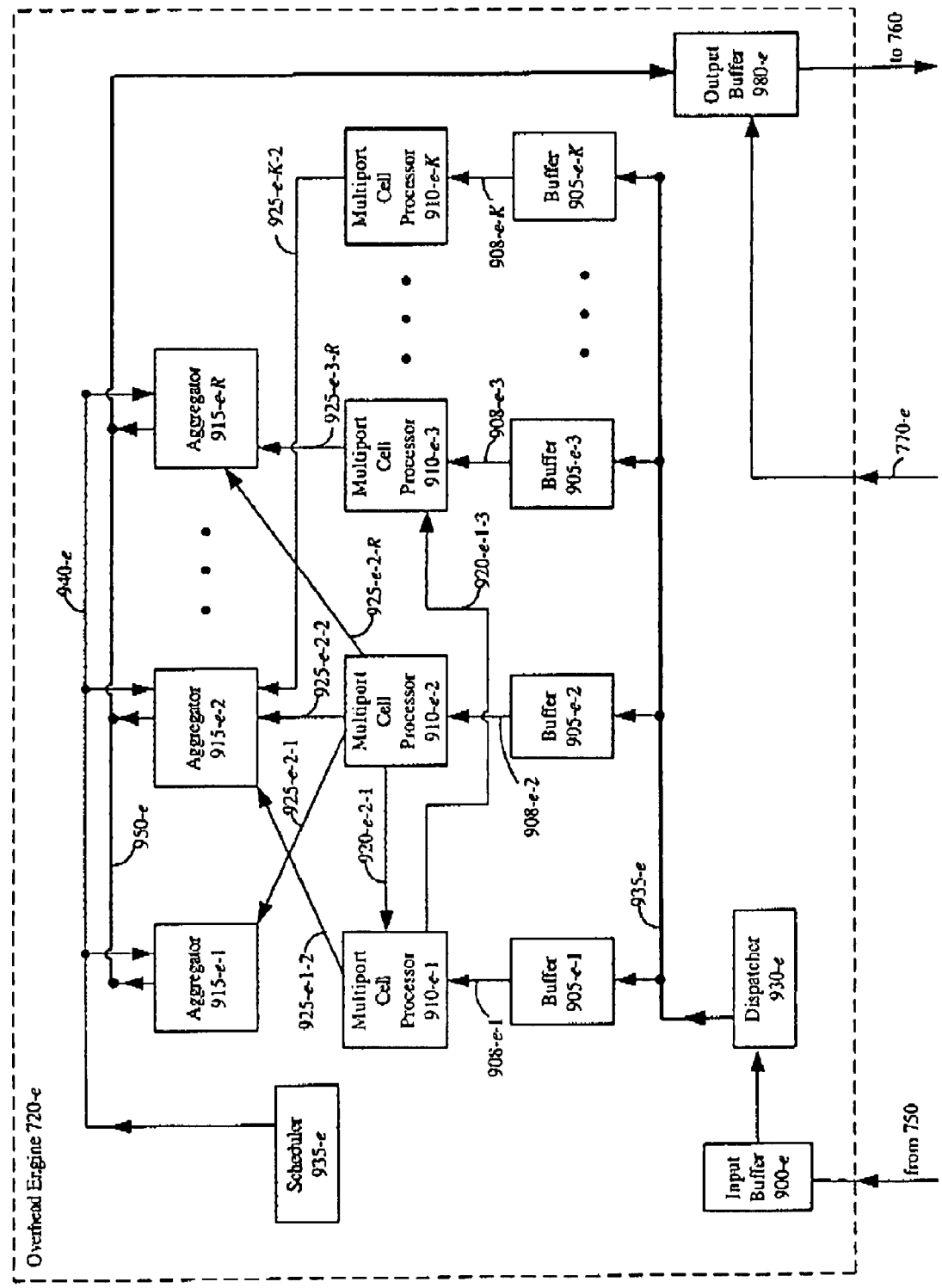
FIG. 9 depicts the structure of overhead engine 720-$e$, as shown in FIG. 7 and FIG. 8.

FIG. 9 depicts a block diagram of the salient components of the architecture of overhead engine 720-$e$, for e=1 to E, wherein E is a positive integer and is the number of overhead engines in overhead processor 650. Overhead engine 720-$e$ comprises: input buffer 900-$e$, dispatcher 930-$e$, scheduler 935-$e$, buffers 905-$e$-1 through 905-$e$-K, where K is a positive integer greater than 1, multiport cell processors 910-$e$-1 through 910-$e$-K, aggregators 915-$e$-1 through 915-$e$-R, where R is a positive integer greater than 1, and output buffer 980-$e$, interconnected as shown. As is explained below, interconnections 920 and 925 are exemplary; it will be clear to those skilled in the art, after reading this specification, how to interconnect the various components within overhead engine 720-e to suite a particular application or protocol.

Overhead engine 720-$e$ receives input overhead blocks via bus 750; each of these input overhead blocks can originate from any of the input ports. (When overhead processor 650 comprises only one overhead engine (i.e., E=1), that overhead engine receives all of the input overhead blocks from all of the input frames that are received on all of the input ports.)

The input overhead blocks received via bus 750 are transmitted to dispatcher 930-$e$ via FIFO input buffer 900-$e$.

Multiport cell processor 910-$e$-$\delta$, for $\delta$=1 to K, accepts an overhead cell as input from the dispatcher and generates an output overhead cell (the next paragraph describes how the dispatcher dispatches the output overhead cells to multiport cell processors 910). Each multiport cell processor is dedicated to processing a particular kind of overhead cell. For example, in a SONET/SDN-based network one multiport cell processor would accept S1 overhead cells (i.e., bytes) and generate new S1 overhead cells, a second multiport cell processor would similarly process J0 overhead cells, and so forth. Thus, as shown in FIG. 9 there are K multiport cell processors, where K is the number of different kinds of overhead cells employed in the particular network protocol (e.g., SONET/SDH, etc.). As indicated by its name, each multiport cell processor processes the appropriate overhead cells (e.g., SONET/SDH S1, SONET/SDH J0, etc.) for some, and possibly all, of node 110's input ports. The illustrated embodiment of the present invention does not require that the input overhead blocks be sent to the overhead engine in any particular order (e.g., ordered by input port, etc.).

Multiport cell processor 910 can generate a data output and send this data output to another multiport cell processor. For example, as depicted in FIG. 9, multiport cell processor 910-$e$-2 sends such a generated data output to multiport cell processor 910-$e$-1 via 920-$e$-2-1. A multiport cell processor receiving such a data output can use it to modify the multiport cell processor's internal state, or can use it for generating an output overhead cell. The manner in which these data outputs are used, as well as the particular configuration of interconnections 920, will depend on the particular protocol and/or application, and will be clear to one of ordinary skill in the art after reading this specification.

Dispatcher 930-*e* segregates the individual overhead cells within the overhead block and dispatches each of the overhead cells to the appropriate corresponding multiport cell processor 910-*e*-δ. For example, if the dispatcher receives a SONET/SDH overhead block containing an S1 overhead cell and a J0 overhead cell, the dispatcher sends the S1 overhead cell to the corresponding S1 multiport cell processor and the J0 overhead cell to the corresponding J0 multiport cell processor.

As shown in FIG. 9, one embodiment of the present invention employs a FIFO buffer 905 at each of the multiport cell processors to buffer incoming overhead cells received from the dispatcher.

Aggregators 915 receive output overhead cells from multiport cell processors 910 via 925, and construct output overhead blocks comprising the output overhead cells, wherein each output overhead block has a respective destination output port. In the exemplary embodiment depicted in FIG. 9, aggregator 915-*e*-2 receives output overhead cells from multiport cell processors 910-*e*-1, 910-*e*-2, and 910-*e*-K via 925-*e*-2-1, 925-*e*-2-2, and 925-*e*-K-2, respectively. In SONET/SDH, for example, each aggregator 915 will construct an output overhead block (i.e., row) comprising three output overhead cells.

Scheduler 935-*e* sends signals to aggregators 915 to coordinate the aggregators' outputting of the output overhead blocks to output buffer 980-*e*. In one illustrative embodiment, scheduler 935-*e* sends signals so that the output overhead blocks arrive at output buffer 980-*e* ordered by output port number (i.e., all the output overhead blocks for output port 1 are transmitted to output buffer 980-*e*, followed by all the output overhead blocks for output port 2, etc.). Such ordering can be accomplished, for example, by time-division multiplexing, a technique well-known in the art.

Output buffer 980-*e* is a standard FIFO that receives output overhead blocks from aggregators 915 and transmits the output overhead blocks out of overhead engine 720-*e* via 760. Output buffer 980-*i*'s transmitting is controlled by signals received from master scheduler 735 via 770-*e*. Master scheduler 735 sends signals to all of the overhead engines so that the output overhead blocks generated by all the overhead engines are "globally" ordered according to port number. In one embodiment such signals are sent based on time-division multiplexing in accordance with the merge sort, a well known sorting algorithm in the computational arts.

Figure 10:
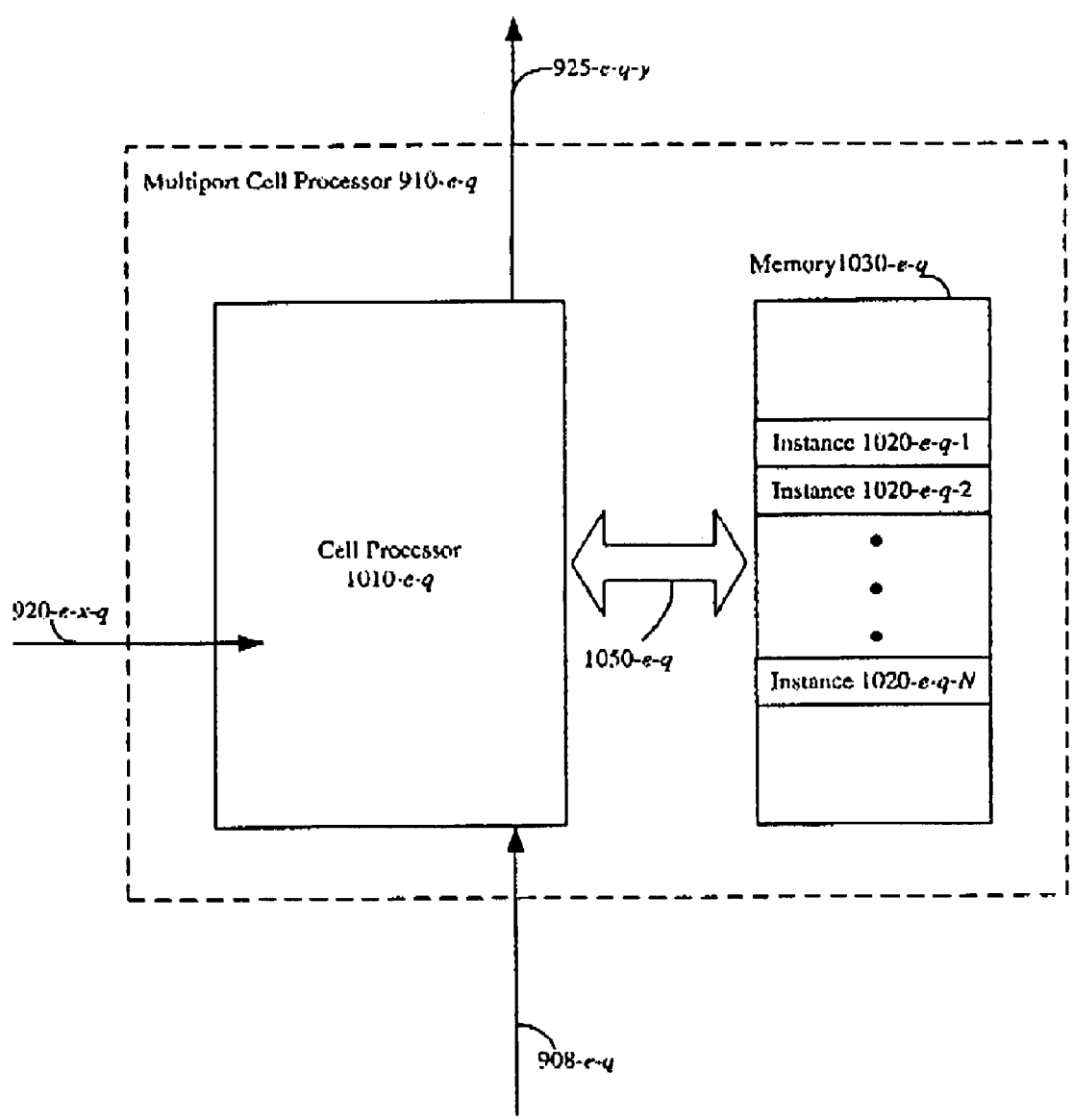
FIG. 10 depicts the structure of multiport cell processor 910-$e$-$q$, as shown in FIG. 9.

FIG. 10 depicts a block diagram of the salient components of multiport cell processor 910-*e*-*q*, where $q \in \{1, 2, \ldots, K\}$, in accordance with the illustrative embodiment. Multipart cell processor 910-*e*-*q* comprises cell processor 1010-*e*-*q* and memory 1030-*e*-*q*. The cell processor 1010-*e*-*q* is coupled to the memory 1030-*e*-*q* via 1050-*e*-*q*. Multiport cell processor 910-*e*-*q* receives an input overhead cell via 908-*e*-*q*, and possibly one or more data outputs from other multiport cell processors via 920, generates an output overhead cell, and outputs the output overhead cell via 925. Since processing the input overhead cell typically varies depending on the input port from which the input overhead cell is received, prior art systems have employed redundant overhead processing logic for each input port. As discussed above, this approach has the disadvantage of requiring more processing logic at the node, which increases the footprint, cost, and power consumption. In the present invention, in contrast, multiport cell processor 910 comprises a single cell processor 1010, and uses this single cell processor in conjunction with memory 1030 in a novel manner, as described below, to process overhead cells from all of the input ports.

Cell processor 1010 employs a set of state variables to perform its processing (the details of the internal architecture of cell processor 1010 are given below), and advantageously applies its processing logic for overhead cells from each input port by using a separate instance of this set of state variables 1020 for each input port. Instances 1020 are kept in memory 1030, and for each new input overhead cell, cell processor 1010 fetches the appropriate instance 1020 from memory 1030, processes the input overhead cell using this instance of variables, and generates an output overhead cell. If any of the values of these variables change during processing, cell processor 1010 stores the new values at the appropriate address of memory 1030. In one embodiment, cell processor 1010 uses the input port number of the input overhead cell as an index into memory 1030 for determining the addresses at which to fetch/store the instance of variables.

Figure 11:
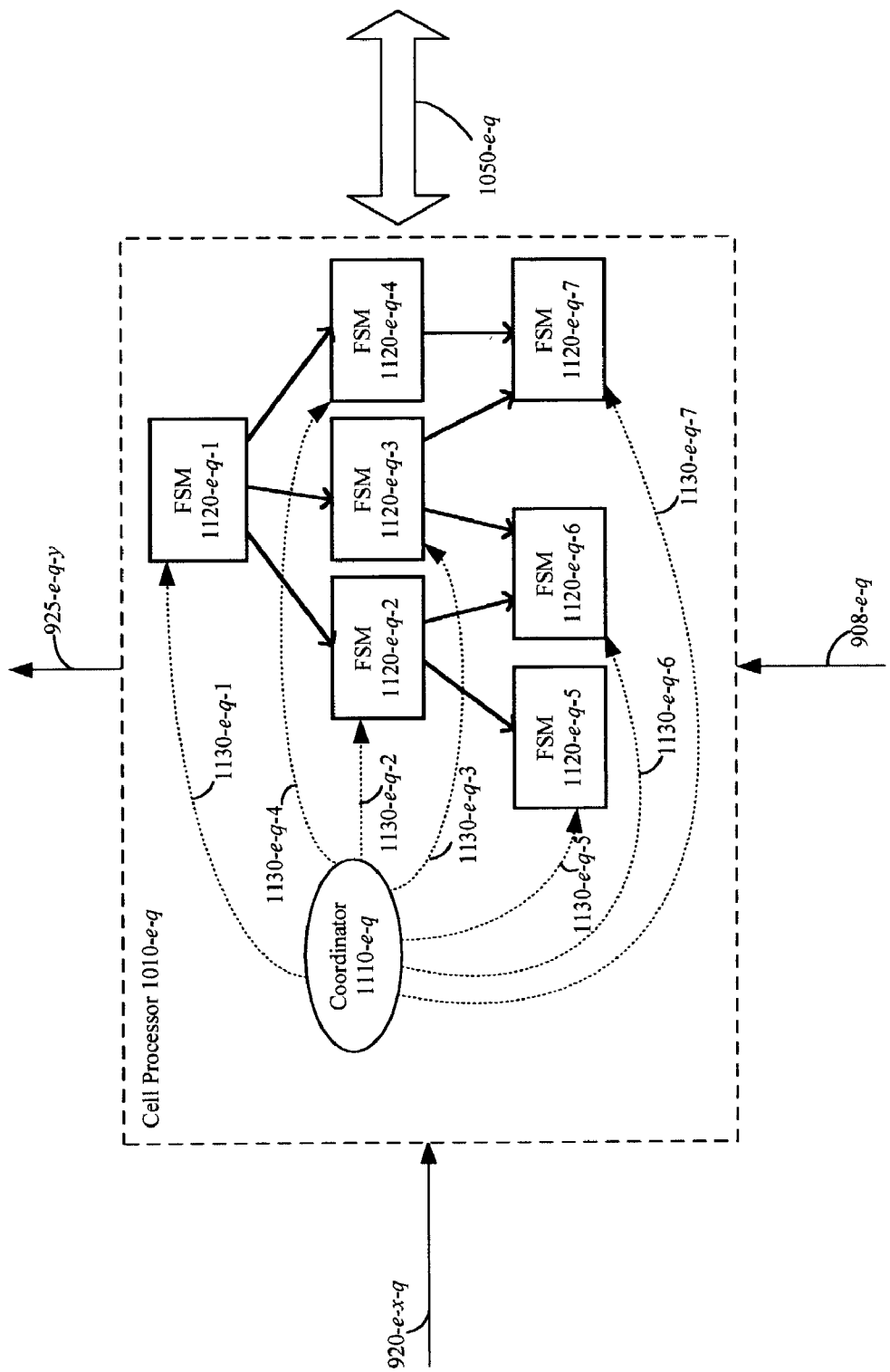
FIG. 11 depicts an abstract representation of cell processor 1010-$e$-$q$, as shown in FIG. 10.

FIG. 11 depicts a block diagram of the salient components of cell processor 1010-*e*-*q*, in accordance with the illustrative embodiment. Cell processor 1010-*e*-q comprises a plurality of finite state machines 1120-*e*-*q*-1 through 1120-*e*-*q*-S, where S is a positive integer greater than 1, and a coordinator 1110-*e*-*q*. Coordinator 1110-*e*-*q* sends signals to each finite state machine 1120-*e*-*q*-*r* via a respective line 1130-*e*-*q*-*r*, where $r \in \{1, 2, \ldots, S\}$. These signals ensure that only one of the finite-state machines 1120 executes at a given time. The logic for determining which finite-state machine 1120 should be active at a given point in time is discussed below.

Each finite-state machine 1120-*e*-*q*-*r* may have one or more special states called "suspended transfer states," each of which specifies another particular finite-state machine to which to transfer execution (for convenience we will call this latter finite-state machine the "specified finite-state machine," and finite-state machine 1120-*e*-*q*-*r* the "calling finite-state machine"). When finite-state machine 1120-*e*-*q*-*r* enters a suspended transfer state, coordinator 1110-*e*-*q* sends signals to suspend execution of finite-state machine 1120-*e*-*q*-*r* and start execution of the specified finite-state machine at its initial state. When the final state of the specified finite-state machine is reached, coordinator 1110-*e*-*q* sends signals to suspend execution of the specified finite-state machine and resume execution of the calling finite-state machine where it left off. It will be clear to one of ordinary skill in the art, after reading this specification, how to implement coordinator 1110-*e*-*q*'s control signals to achieve this functionality.

As shown in FIG. 11, finite-state machines 1120 form a hierarchy represented by a rooted directed acyclic graph (DAG), where the root finite-state machine of the DAG is 1120-*e*-*q*-1. This DAG does not denote physical connections between the finite-state machines, but rather is an abstract representation of the relationships between pairs of finite-state machines. In particular, a first finite-state machine is depicted as a parent of a second finite-state machine if and only if the first finite-state machine has a suspended transfer state specifying the second finite-state machine. For convenience, we say that the parent finite-state machine "calls" the child finite-state machine.

Figure 12:
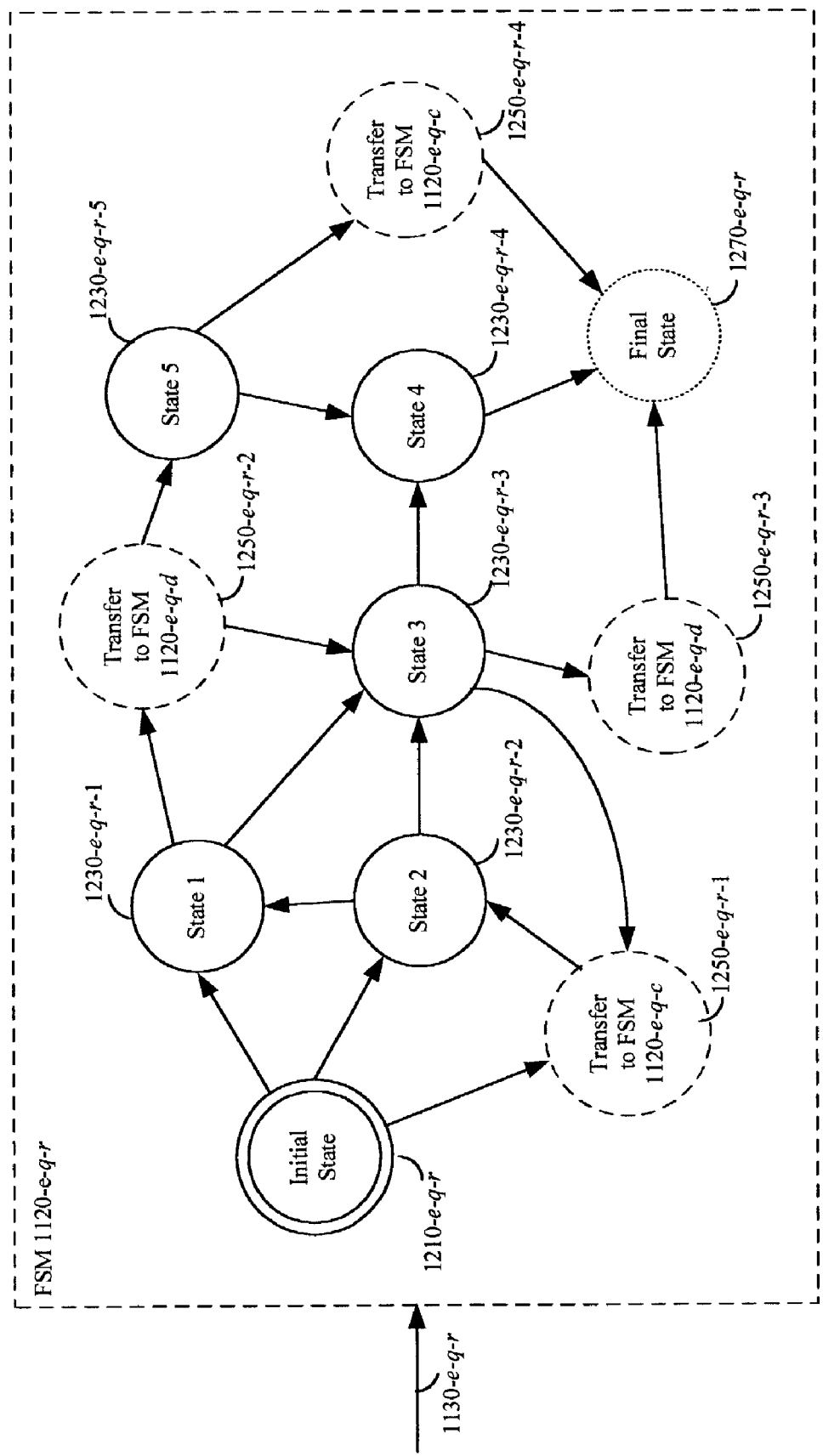
FIG. 12 depicts an abstract representation of finite-state machine 1120-$e$-$q$-$r$, as shown in FIG. 11.

FIG. 12 depicts an abstract representation of an exemplary finite-state machine 1120-*e*-*q*-*r*, as shown in FIG. 11. Such an abstract representation of a finite-state machine, in contrast to an actual implementation of a finite-state machine, is well-known to those in the art. As shown in FIG. 12, exemplary finite-state machine 1120-*e*-*q*-*r* comprises initial state 1210-*e*-*q*-*r*, final state 1270-*e*-*q*-*r*, five "normal" states 1230-*e*-*q*-*r*-1 through 1230-*e*-*q*-*r*-5, and four suspended transfer states 1250-*e*-*q*-*r*-1 through 1250-*e*-*q*-*r*-4, with state transitions depicted by the arcs as shown.

Note that there are two suspended transfer states specifying finite-state machine 1120-*e*-*q*-*c*, and two suspended transfer states specifying finite-state machine 1120-*e*-*q*-*d*. Typically each specified finite-state machine will in fact be specified by at least two suspended transfer states, as in FIG. 12, as the motivation for having a plurality of finite-state machines is to minimize the amount of logic in cell processor 1010. (If a child finite-state machine is only called once from a parent finite-state machine, there is no savings in logic by separating out the child finite-state machine from the parent, as is the case when the child finite-state machine is called multiple times.)

In some embodiments, instead of employing a centralized coordinator 1110-*e*-*q* for transferring control between finite-state machines, each finite-state machine includes appropriate logic for "calling" a child finite-state machine and "returning" to a parent finite-state machine.

Figure 13:
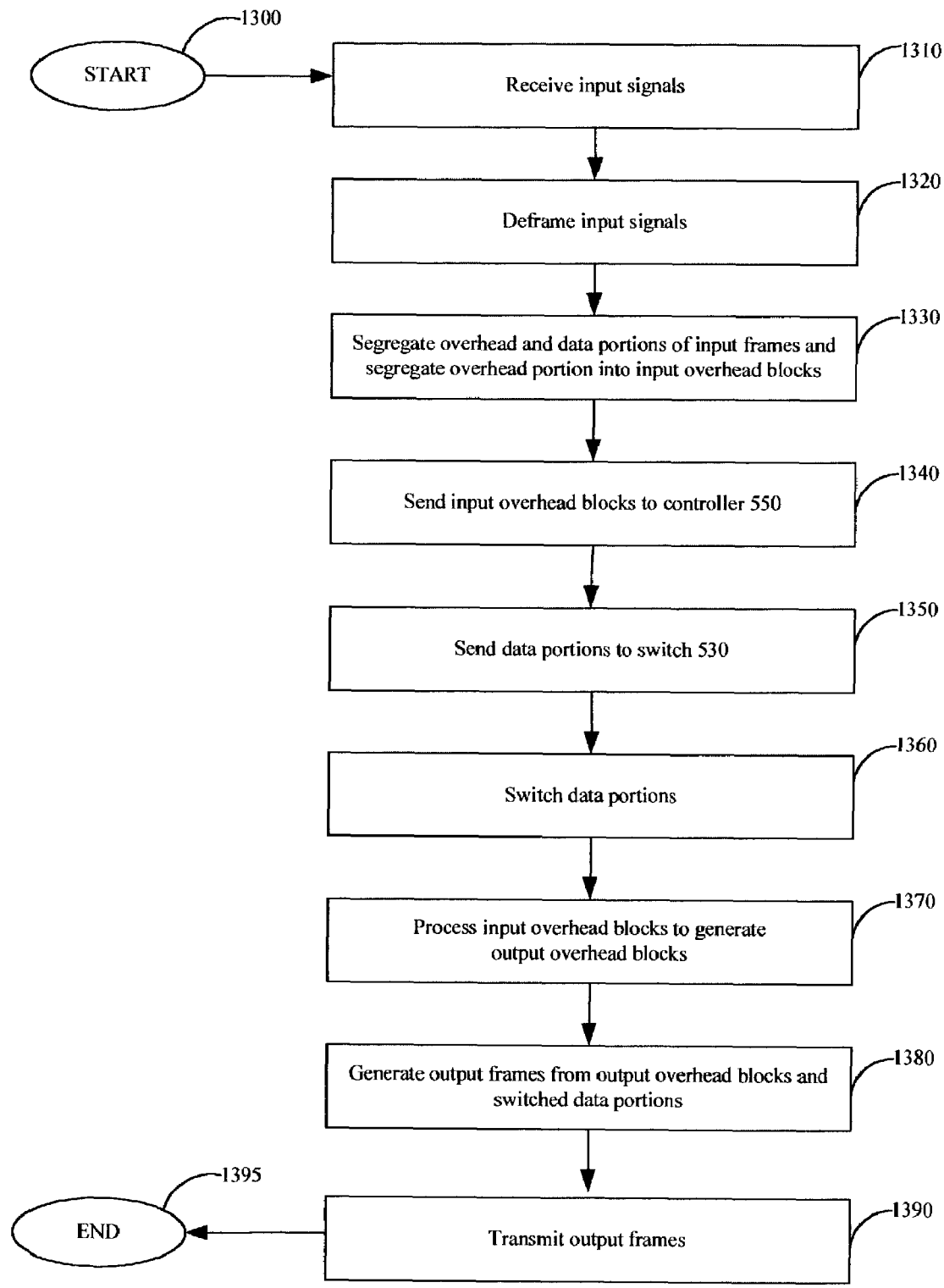
FIG. 13 depicts a flowchart of the operation of node 110-$i$, as shown in FIG. 1, in accordance with the illustrative embodiment of the present invention.

FIG. 13 depicts a flowchart of the operation of node 110-*i* according to the present invention.

At task 1310, node 110-*i* receives input signals via input ports 120-$j_\alpha$-*i*.

At task 1320, the node's input processors divide the received input signals into frames in well-known fashion.

At task 1330, the input processors segregate the input frames into overhead and data portions and segregate the overhead portions into input overhead blocks, in well-known fashion.

At task 1340, the input processors send the input overhead blocks to overhead processor 650.

At task 1350, the input processors send the data portions to switch 630.

At task 1360, switch 630 switches the data portions, as is well-understood in the art.

At task 1370, overhead processor 650 processes the input overhead blocks and generates new output overhead blocks. The task of generating new overhead blocks is dependent on the particular protocol (e.g., SONET, etc.) and is well-known in the art.

The particular implementation in which overhead processor 650 performs this task in the present invention is disclosed in the foregoing detailed description of FIGS. 7-12.

At task 1380, the node's output processors 690 generate output frames from the switched data portions and the generated output overhead blocks, in well-known fashion.

At task 1390, output processors 690 transmit the generated output frames via outgoing links 120-*i*-$k_\alpha$.

Figure 14:
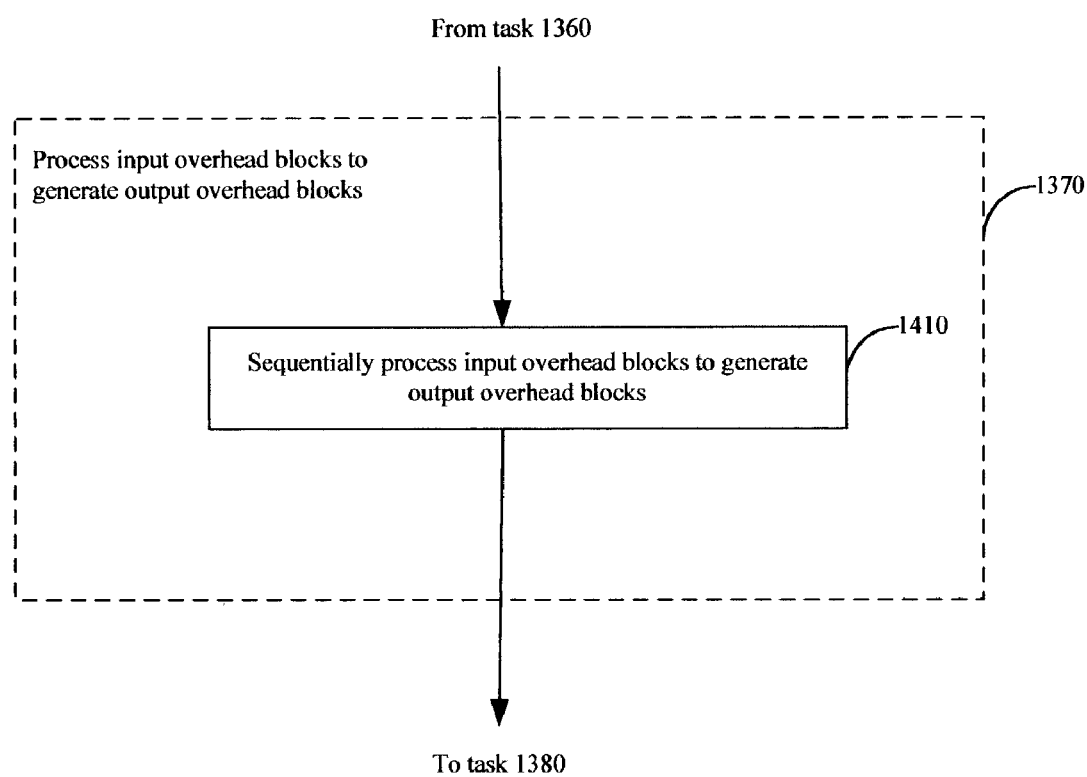
FIG. 14 depicts a first illustrative embodiment of task 1370, as shown in the flowchart of FIG. 13.

FIG. 14 depicts a first illustrative embodiment of task 1370, shown as task 1410, in a preferred embodiment of the present invention comprising a single overhead engine. In task 1410 the overhead engine generates the output overhead blocks sequentially by processing each of the M input overhead blocks, one at a time.

Figure 15:
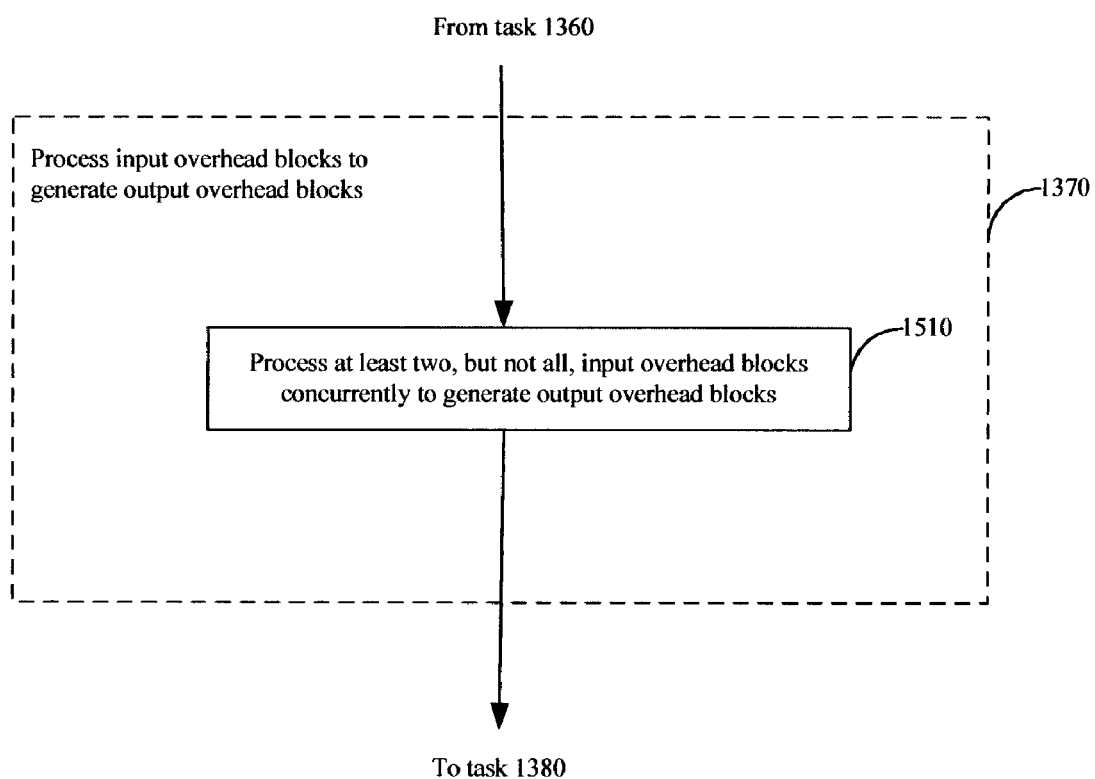
FIG. 15 depicts a second illustrative embodiment of task 1370, as shown in the flowchart of FIG. 13.

FIG. 15 depicts a second illustrative embodiment of task 1370, shown as task 1510, in a preferred embodiment of the present invention where E, the number of overhead engines, is an integer such that 1<E<M. In task 1510, at least two, but not all, of the overhead blocks are processed concurrently (i.e., there is at least one overhead engine that sequentially processes two or more overhead blocks).

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A node in a telecommunication network, said node having M input ports and N output ports, said node comprising:
    a switch;
    an overhead engine comprising a multiport cell processor for generating output overhead cells based on input overhead cells;
    M input processors, each said input processor for
        receiving input frames from a respective one of said M input ports, wherein each of said input frames comprises a data portion and at least one of said input overhead cells,
        transmitting said data portions to said switch, and
        transmitting to said overhead engine
            (i) said input overhead cells contained within said input frames, and
            (ii) information associating each of said input overhead cells with the input port said input overhead cell was received on; and
    N output processors, each said output processor for
        receiving at least one of said data portions from said switch,
        receiving at least one of said output overhead cells from said overhead engine,
        building an output frame comprising at least one of said data portions and at least one of said output overhead cells, and
        outputting said output frame on a respective one of said output ports;
    wherein said multiport cell processor is CHARACTERIZED BY:
        a memory for storing M instances of a non-empty set of state variables, wherein each of said instances is associated with a respective one of said M input ports; and
        a cell processor for
            receiving said input overhead cells and said information associating said input overhead cells with said input ports, and
            generating an output overhead cell based on at least one of:
                (a) said input overhead cell, and
                (b) said instance of said set of state variables associated with the same input port as said input overhead cell,
            wherein said output overhead cell is associated with one of said output ports;
    wherein M and N are positive integers, M≧2, and N ≧2; and
    wherein said overhead engine comprises K of said multiport cell processors $R_1$ through $R_K$, and wherein said overhead engine further comprises a dispatcher for receiving said input overhead cells from said input processors, and wherein each of said input overhead cells belongs to one of K categories $C_1$ through $C_K$, and wherein for all j ∈{1, 2, . . . , K} said dispatcher dispatches each of said input overhead cells belonging to said category $C_j$ to said multiport cell processor $R_j$, wherein K is a positive integer and K≧2.

2. The node of claim 1 wherein said cell processor is also for fetching said instance of said set of state variables from said memory at addresses based on (i) said input port associated with said input overhead cell, and (ii) a state of said cell processor.

3. The node of claim 2 wherein said cell processor is also for:
   updating said instance of said set of state variables,
   storing said instance of said set of state variables into said memory at addresses based on
      (i) said input port associated with said input overhead cell, and
      (ii) a state of said cell processor, and
   outputting said output overhead cell.

4. The node of claim 3 wherein said cell processor uses said input port associated with said input overhead cell as an index into said memory to determine at least one of said addresses in said fetching and said storing.

5. The node of claim 1 wherein at least one of said multiport cell processors generates at least one data output and sends said data output to at least one other of said multiport cell processors.

6. The node of claim 5 wherein said other multiport cell processor uses said data output to determine a state of said other multiport cell processor.

7. The node of claim 5 wherein said other multiport cell processor generates at least one said output overhead cell based on said data output.

8. The node of claim 1 further comprising at least one aggregator, said aggregator for receiving at least one of said output overhead cells from at least one of said multiport cell processors and outputting at least one output overhead block, wherein each of said output overhead blocks comprises at least one said output overhead cell and is associated with a respective one of said output processors, and wherein said overhead engine transmits said output overhead block to said respective output processor.

9. The node of claim 8 further comprising a scheduler for controlling said transmitting of said output overhead blocks to said output processors.

10. An apparatus in a node of a telecommunication network, said node having M input ports and N output ports, said apparatus comprising:
   a dispatcher for receiving input overhead cells, wherein each of said input overhead cells is associated with a respective one of said input ports; and
   K multiport cell processors $R_1$ through $R_K$, said multiport cell processor comprising:
      a memory for storing M instances of a non-empty set of variables, wherein each of said instances is associated with a respective one of said M input ports; and
      a cell processor for
         receiving input overhead cells from said dispatcher, and
         generating an output overhead cell based on at least one of:
            (a) said input overhead cell, and
            (b) said instance of said set of variables associated with the same input port as said input overhead cell,
         wherein said output overhead cell is associated with one of said output ports;
   wherein each of said input overhead cells belongs to one of K categories $C_1$ through $C_K$, and wherein for all $j \epsilon \{1, 2, \ldots, K\}$ said dispatcher dispatches each of said input overhead cells belonging to said category $C_j$ to said multiport cell processor $R_j$, and
   wherein M, N, and K are positive integers, $M \geq 2$, $N \geq 2$, and $K \geq 2$.

11. The apparatus of claim 10 wherein said cell processor is also for fetching said instance of said set of variables from said memory at addresses based on
   (i) said input port associated with said input overhead cell, and
   (ii) a state of said cell processor.

12. The apparatus of claim 11 wherein said cell processor is also for:
   updating said instance of said set of variables,
   storing said instance of said set of variables into said memory at addresses based on
      (i) said input port associated with said input overhead cell, and
      (ii) a state of said cell processor, and
   outputting said output overhead cell.

13. The apparatus of claim 12 wherein said cell processor uses said input port associated with said input overhead cell as an index into said memory to determine at least one of said addresses in said fetching and said storing.

14. The apparatus of claim 10 wherein at least one of said multiport cell processors generates at least one data output and sends said data output to at least one other of said multiport cell processors.

15. The apparatus of claim 14 wherein said other multiport cell processor uses said data output to determine a state of said other multiport cell processor.

16. The apparatus of claim 14 wherein said other multiport cell processor generates at least one said output overhead cell based on said data output.

17. The apparatus of claim 10 further comprising M input processors, said input processor for
   receiving input frames from a respective one of said M input ports, wherein each of said input frames comprises at least one said input overhead cell, and
   transmitting said input overhead cells to said dispatcher.

18. The apparatus of claim 10 further comprising M input processors, said input processor for
   receiving input frames from a respective one of said M input ports, wherein each of said input frames comprises at least one input overhead block, and wherein each of said input overhead blocks comprises at least one input overhead cell, and
   transmitting said input overhead blocks to said dispatcher.

19. The apparatus of claim 10 further comprising at least one aggregator, said aggregator for receiving at least one of said output overhead cells from at least one of said multiport cell processors and outputting at least one output overhead block, wherein each of said output overhead blocks comprises at least one said output overhead cell and is associated with a respective one of said output ports.

20. The apparatus of claim 19 further comprising N output processors, wherein each of said output processors is associated with a respective one of said output ports, each of said output processors for
   receiving said output overhead blocks associated with said respective output port,
   building an output frame comprising at least one of said output overhead blocks, and
   outputting said output frame on said respective output port.

21. The apparatus of claim 20 further comprising a scheduler for controlling said transmitting of said output overhead blocks to said output processors.

* * * * *